United States Patent [19]

Hanson et al.

[11] Patent Number: 5,335,155
[45] Date of Patent: Aug. 2, 1994

[54] TAIL LIGHT CONSTRUCTION

[75] Inventors: Brian A. Hanson, Therasa; Edgar C. Paffrath, West Bend, both of Wis.

[73] Assignee: Wesbar Corporation, West Bend, Wis.

[21] Appl. No.: 980,339

[22] Filed: Nov. 23, 1992

[51] Int. Cl.$^5$ .................. G60Q 1/26; F21V 33/00
[52] U.S. Cl. ..................... 362/267; 362/80; 362/268; 362/390
[58] Field of Search ............... 362/61, 80, 267, 268, 362/285, 310, 368, 369, 390

[56] References Cited

U.S. PATENT DOCUMENTS

| | | | |
|---|---|---|---|
| 2,102,029 | 12/1937 | Putterman. | |
| 2,469,274 | 5/1949 | Rein | 362/61 |
| 2,637,804 | 5/1953 | Hollins | 362/267 |
| 2,738,414 | 3/1956 | Davis et al. | 362/267 |
| 2,831,964 | 4/1958 | Diedring | 362/61 |
| 2,999,923 | 9/1961 | Schmidt | 362/263 |
| 3,275,816 | 9/1966 | Brunger | 362/267 |
| 4,214,683 | 7/1980 | Wills et al. | 362/61 |
| 4,281,367 | 7/1981 | Moore et al. | 362/96 |
| 4,290,098 | 9/1981 | Pierson | 362/267 |
| 4,445,163 | 4/1984 | Ziaylek, Jr. | 362/267 |
| 4,617,617 | 10/1986 | Cunningham et al. | 362/267 |
| 4,930,050 | 5/1990 | Poizner | 362/267 |
| 5,060,121 | 10/1991 | Cunningham et al. | 362/61 |

FOREIGN PATENT DOCUMENTS

| | | | |
|---|---|---|---|
| 236676 | 6/1960 | Australia | 362/367 |
| 274021 | 5/1971 | U.S.S.R. | 362/267 |
| 2169392 | 7/1986 | United Kingdom | 362/267 |

Primary Examiner—Ira S. Lazarus
Assistant Examiner—Y. Quach
Attorney, Agent, or Firm—Andrus, Sceales, Starke & Sawall

[57] ABSTRACT

A tail light construction comprising an outer housing having an aperture that extends therethrough. An annular resilient grommet is disposed in the aperture and a metal bulb holder is mounted within the central opening of the grommet and includes a socket which receives the base portion of a light bulb. The axis of the bulb is located at an acute angle with respect to the base of the housing. A lens encloses one end of the central opening of the grommet, while either a lens or an opaque closure plate encloses the opposite end. Electrical connectors are connected to the bulb and extend in sealed relation through the grommet and are connected to electrical leads.

21 Claims, 3 Drawing Sheets

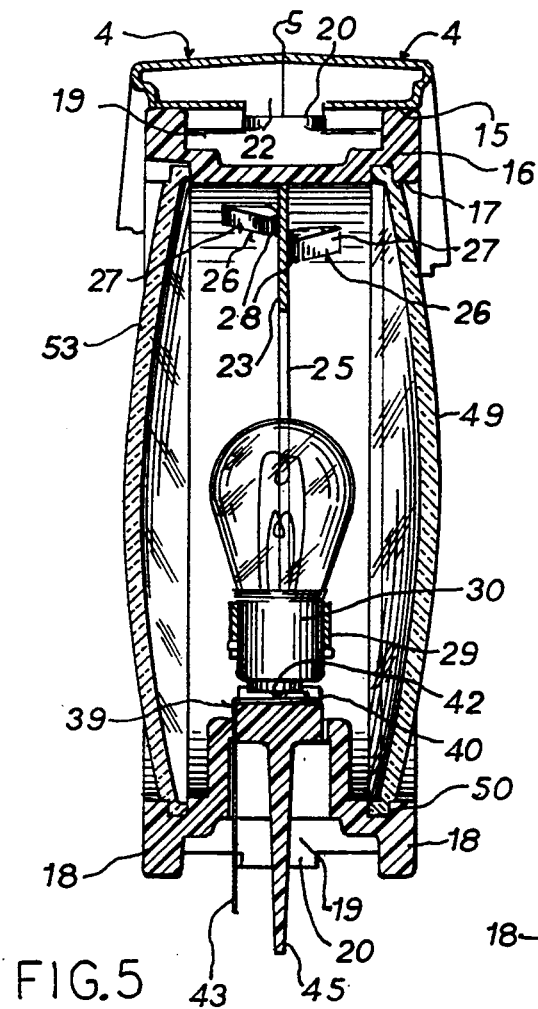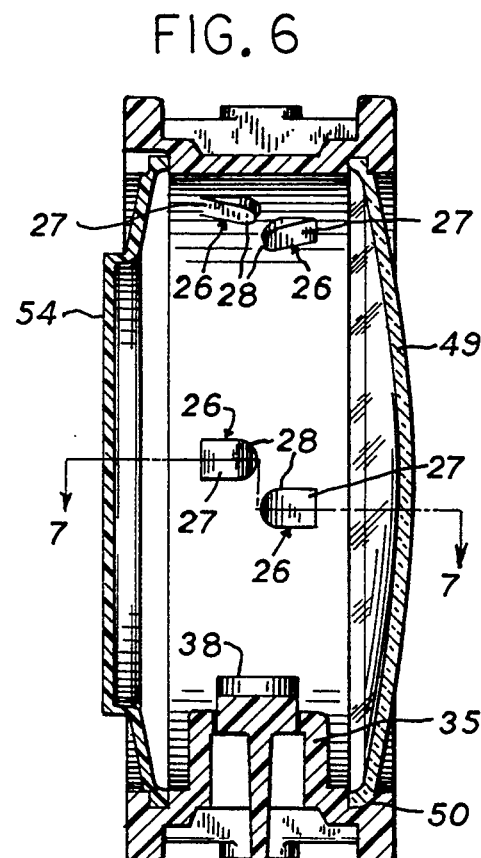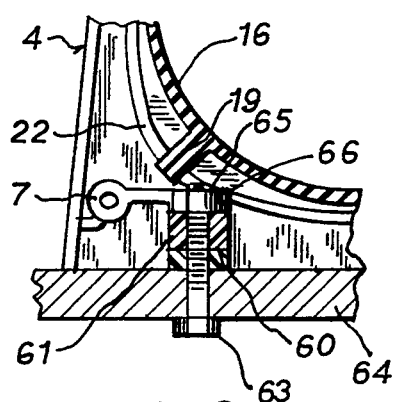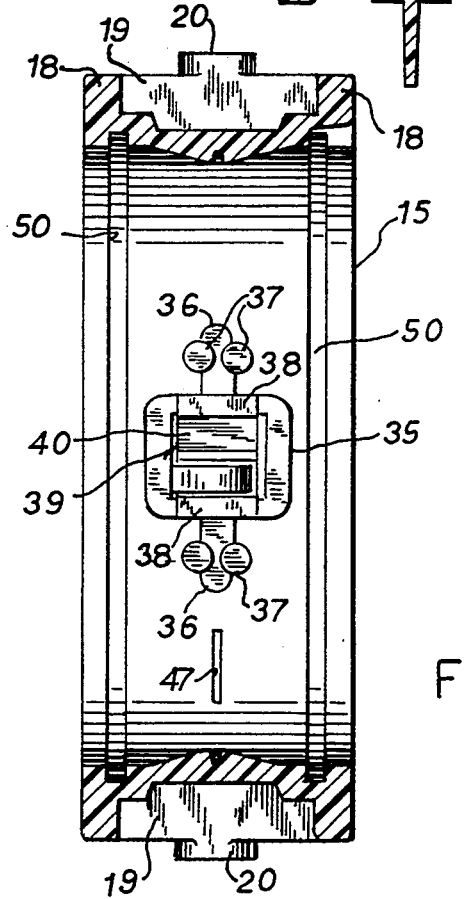

TAIL LIGHT CONSTRUCTION

BACKGROUND OF THE INVENTION

There are no federal regulations, at present, governing the use of lights on agricultural field equipment that is being towed on public roads or highways. However, there has been increased interest in the use of lights for agricultural field equipment because of safety concerns, as well as potential legal liability.

Agricultural field equipment,. such as wagons, plows, manure spreaders, and the like, have various shapes and configurations, so that the lights must be capable of being mounted on various surfaces of all types of equipment without the need for specialized brackets or connectors. Further, lights to be used with agricultural field equipment, must be able to withstand the rigorous field and environmental conditions that are encountered through normal use of the equipment and be resistant to moisture, dust and chemicals.

SUMMARY OF THE INVENTION

The invention is directed to a tail light construction having particular use with towed agricultural field equipment. In accordance with the invention, the light includes a housing composed of two mating halves or sections, and the housing has a flat base which is adapted to be secured to a surface of the field equipment.

The housing is provided with at least one aperture that extends through the housing and the axis of the aperture is parallel to the base. Mounted within the aperture is an annular resilient grommet formed of plastic or rubber-like material, and the grommet has a central opening. A bulb holder or retainer, preferably formed of sheet metal, is mounted within the opening in the grommet and has an outer curved edge which engages notches in the inner surface of the grommet to locate the bulb holder within the grommet.

The bulb holder includes a generally cylindrical socket which receives the base portion of a light bulb and the axis of the bulb is preferably located at an angle of about 45° with respect to the base of the housing.

Electrical conductors are connected to the bulb holder and extend in sealed relation through slits in the grommet and are connected to electrical leads.

One end of the central opening in the grommet is enclosed by a lens, while the opposite end of the opening can be enclosed either by a second lens or an opaque closure.

With the invention, the grommet, bulb holder and the bulb comprise an enclosed unit which seals the bulb and connections against dust, moisture and chemicals to prevent corrosion. The resilient nature of the grommet provides shock and impact resistance for the bulb which is important when the light is utilized on agricultural field equipment due to the fact that the equipment during normal use may travel over rough terrain.

The invention can be produced either as a single light unit, or a double light unit. In a double light unit, one light is normally provided with a red rear-facing lens, while the other light can be provided with an amber rear facing lens along with a high intensity flashing bulb. In addition, the forward facing side of the light having the rear facing red lens, normally has an opaque closure while the forward side of the light having the rear facing amber lens normally is enclosed with an amber lens.

With a single light unit, a rear facing red or amber lens can be used, while a forward facing amber lens or opaque closure can be employed.

In a preferred form of the invention, the housing is generally rectangular in shape and the aperture in the housing is of similar generally rectangular configuration. In this construction, the grommet acts as an adaptor, having an outer surface to fit the generally rectangular aperture in the housing and having an inner cylindrical opening to accommodate the lens.

The bulb holder is preferably formed of sheet metal and has a curved or generally circular outer periphery which is engaged with notches in the inner surface of the grommet to thereby locate the bulb holder centrally of the grommet. As the bulb holder is formed of metal, or other rigid material, it also serves to prevent inward deformation of the grommet.

The bulb holder being opaque also serves as a light shield, which is an advantage in situations where the light may include an amber lens on one surface and a red lens on the opposite surface. As a further advantage, the metallic bulb holder serves to dissipate heat generated by the bulb during usage and this is particularly beneficial in connection with the amber, high intensity flashing bulb.

Other objects and advantages will appear in the course of the following description.

DESCRIPTION OF THE DRAWINGS

The drawings illustrate the best mode presently contemplated of carrying out the invention.

In the drawings:

FIG. 5 is a section taken along line 5—5 of FIG. 3;

FIG. 6 is a transverse section of the resilient grommet with the bulb holder removed;

FIG. 7 is a view taken along line 7—7 of FIG. 6; and

FIG. 8 is a section taken along line 8—8 of FIG. 4.

DESCRIPTION OF THE ILLUSTRATED EMBODIMENT

Figure 1:
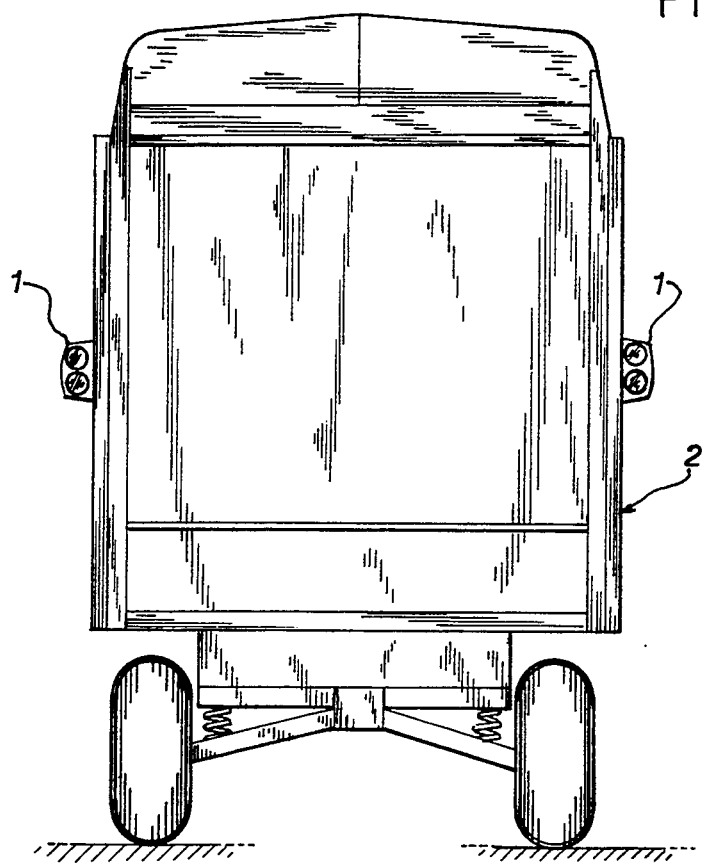
FIG. 1 is a rear end view of an agricultural wagon incorporating a pair of tail lights of the invention.

FIG. 1 shows a pair of tail lights 1 of the invention as mounted on the sides of a vehicle 2, which is preferably an agricultural field vehicle, such as a forage wagon, manure spreader, plow, or the like.

Each light 1 is composed of a housing 3 formed of a pair of mating housing sections or halves 4, which are joined together along a central parting line 5. Housing sections 4 are connected together by a plurality of fasteners 6, such as screws, which extend through openings in one of the sections 4 and are threaded within bosses 7 in the other housing section.

Housing 3 is preferably formed of a corrosion and impact resistant material, such as fiber reinforced, thermosetting resin.

Figure 2:
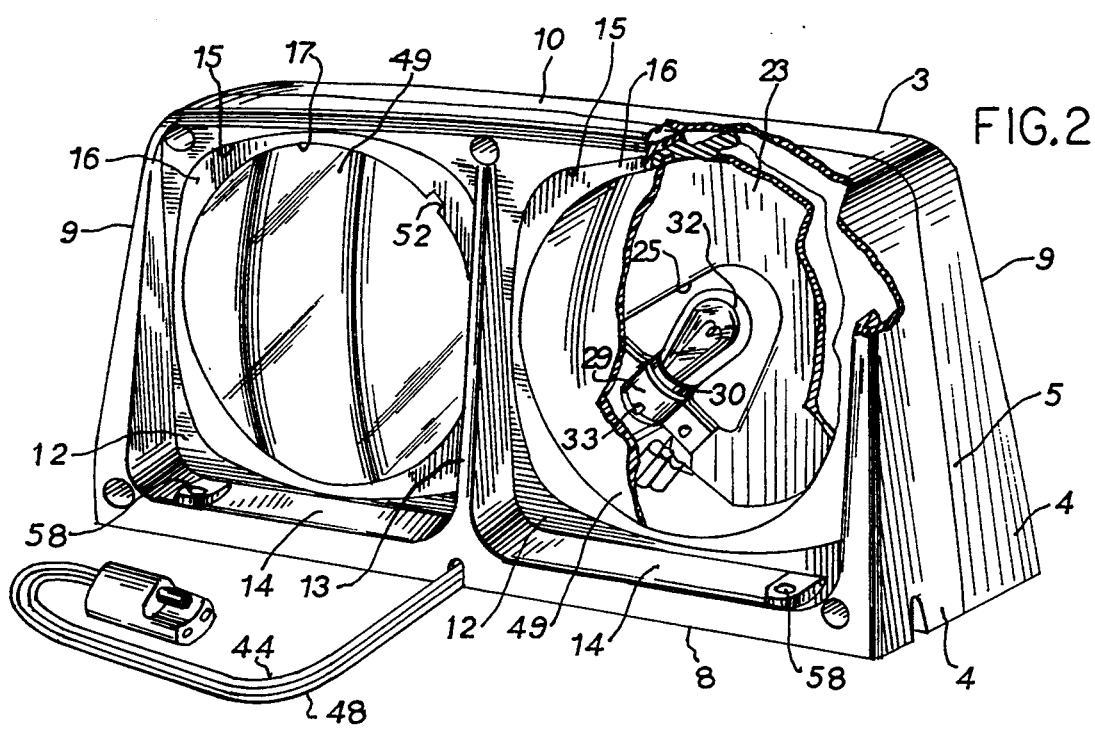
FIG. 2 is a perspective view of the tail light with parts broken away in section.

As best seen in FIG. 2, housing 3 includes a generally flat base 8, and a pair of sloping end surfaces 9 which are joined together by a top surface 10. In addition housing 3 includes a pair of opposed side surfaces 12 and a central rib 13 projects outwardly from each side surface and merges with surfaces 14 which are parallel to base surface 8, as shown in FIG. 2.

The light 1, as illustrated in the drawings, is a double light unit, and includes a pair of apertures 15 which extend through the housing 3. Each aperture is generally rectangular in shape and has rounded or curved corners.

Mounted within each aperture 15 is a resilient elastomeric grommet 16 formed of rubber or plastic material. Each grommet 16 is provided with a central opening 17 which is circular in shape.

The outer surface of grommet 16 is provided with a pair of parallel flanges 18 and the peripheral edge of each flange 18 is generally rectangular in shape and compliments the aperture 15 of the housing. Connecting the flanges 18 are a plurality of outwardly projecting ribs 19 that are disposed generally parallel to the axis of the central opening of the grommet. Each rib is provided with a central, outwardly projecting projection 20, as best seen in FIGS. 6 and 7. Ribs 19 serve as locators, and the ends of the ribs engage the annular ribs 22 formed in the housing sections 4. With the ends of the ribs 19 engaged with the ribs 22, the outer surfaces of the grommet will be flush with the side surfaces 12 of the housing.

Mounted within each grommet 16 is a bulb holder or retainer 23, preferably formed of sheet metal. Bulb holder 23 has an outer generally cylindrical peripheral edge 24 and is provided with a central opening 25. Bulb holder 23 is mounted centrally within the opening 17 of grommet 16 by engagement of the outer edge 24 of the bulb holder between pairs of opposed tabs 26, which are formed in the inner surface of the grommet. Each tab 26 is provided with an inclined surface 27, which terminates in a ledge or shoulder 28. The shoulders of adjacent tabs define a notch to receive the peripheral edge 24 of the bulb holder, as best illustrated in FIG. 5.

Figure 3:
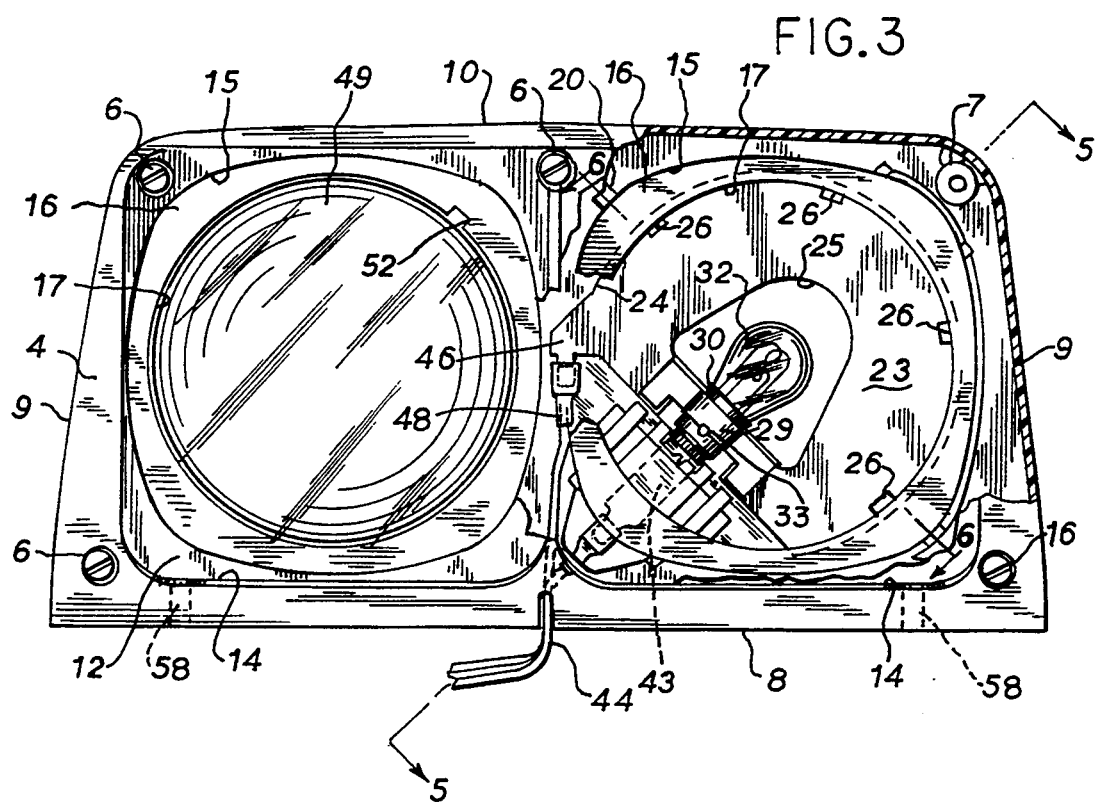
FIG. 3 is a front view of the tail light with parts broken away in section.

Bulb holder 23 includes a generally cylindrical socket 29, which receives the base portion 30 of a light bulb 32. As best illustrated in FIG. 3, the axis of socket 29 and bulb 32 is located at an acute angle of about 45° with respect to the base 8 of the housing 3.

To properly locate bulb 32 with respect to socket 29, the base portion 30 of the bulb is provided with an outwardly projecting pin 33, which is received within a notch in socket 29. Engagement of the pin with the notch will ensure that the filament of the bulb is parallel to the plane of bulb holder 23.

The resilient grommet 16 is also formed with an inwardly projecting block 35, as illustrated in FIGS. 6 and 7. Extensions 36 extend outwardly from opposite sides of block 35 and a pair of posts 37 project inwardly from each extension. The edge of the bulb holder 23 is received in the space between adjacent posts 37, thereby aiding in supporting the bulb holder within the grommet 16. In addition, a pair of flanges 38 extend inwardly from block 35 and act to cushion the base portion of the bulb against vibration.

An L-shaped conductor strip 39 is provided with a leg 40 which is located on the inner surface of block 35 and is adapted to engage a contact 42 on the lower surface of the base portion 30 of bulb 32. Conductor strip 39 is also provided with a second elongated leg 43 which extends in sealed relation through a slit in the grommet and the outer end of leg 43 is connected to an electrical lead 44. Normally only a single conductor strip 39 is connected to the bulb 32. However, in situations where a dual intensity bulb is employed, a pair of conductor strips may be utilized, and in that situation the tongue 45 on grommet 16 acts to separate and insulate the outer legs 43 of the two conductor strips.

As seen in FIG. 3, bulb holder 23 is also formed with an outwardly extending tab 46, which extends in sealed relation through a slit 47 in the grommet, and is attached to an electrical lead 48.

The rear facing end of the opening 17 in each grommet 16 is enclosed by a glass or plastic lens 49. The lens can be either red or amber in color. Lens 49 is sealed to the grommet by engagement of the peripheral edge of the lens with an internal groove 50 formed in the grommet.

Each grommet 16 is provided with one or more notches 52, that communicate with groove 50, and a tool can be inserted in the notch 52 to aid in removal of the lens 49 from the grommet.

The forward facing end of the opening 17 in each grommet 16 is enclosed by either a lens or an opaque bezel or closure plate. FIG. 5 shows the forward-facing side of one grommet 16 enclosed by a lens 53, while FIG. 6 shows the forward-facing side of a second grommet enclosed by a closure plate 54. Lens 53 and closure plate 54 are connected to the grommet in the same manner as lens 49 is connected to the grommet.

With a dual light unit, one of the rear facing lenses 49 is red and is associated with a low intensity bulb 32, while the second rearwardly facing lens 49 is amber and is associated with a high intensity flashing bulb. The forwardly facing lens 53 is preferably red in color.

Figure 4:
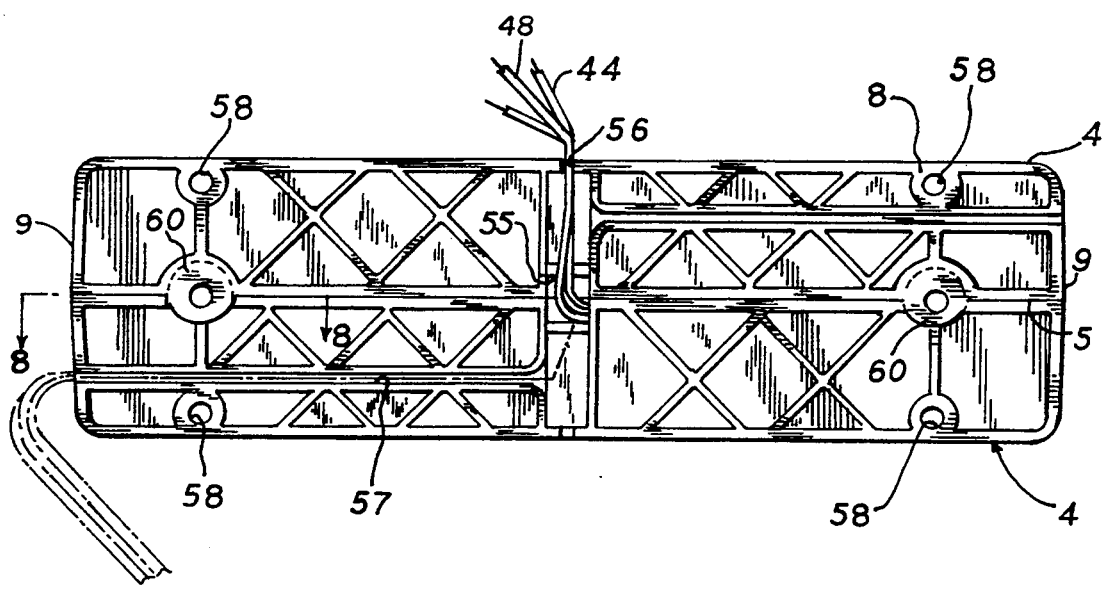
FIG. 4 is a bottom view of the light.

The leads 44 and 48 extend through an opening 55 in base 8 of the housing, as shown in FIG. 4. Base 8 preferably has a waffle-like pattern, which increases the rigidity of the base, as well as reducing the weight of the housing. The leads 44 and 48 are shown to project through a notch 56 in the side edge of the base. Alternately, the leads can extend through a longitudinal channel 57 formed in the base and exit from the end of the base, as shown by the dashed lines in FIG. 4.

As a feature of the invention, housing 3 is provided with several different mounting arrangements to accommodate various types of vehicles. In one mounting arrangement, screws, or other fasteners can be inserted through holes 58 located in surfaces 14 and threaded into a surface on the vehicle. In a second mounting arrangement, screws can extend through a surface of the vehicle, and are threaded within aligned holes 59 in bosses 60 and 61. Boss 60 is formed on one of the housing sections 4 and overlapping boss 61 is formed on the other housing section, as shown in FIG. 8.

In a third mode of mounting, instead of using screws, a bolt 63 is inserted through a surface 64 of the vehicle and then through the aligned holes in the bosses 60 and 61 and is threaded in a nut 65 that is mounted within a mating semi-hex pockets 66, formed in the housing section 4. The nuts 65 are assembled in the pockets 66 before the housing sections 4 are clamped together. The pockets 66 prevent rotation of the nuts 65 as the bolts 63 are threaded with the nuts.

With these mounting arrangements, the housing can be conveniently attached to horizontal, vertical, or angular surfaces on the vehicle without the use of additional brackets or clamps.

With the invention, an isolated sealed module consisting of the resilient grommet 16, bulb holder 23, bulb 32, and lenses 49 and 53, is provided. Thus, the bulb and connections are sealed against dust, moisture, and chemicals to prevent corrosion of the electrical connections. In addition, the resilient grommet provides shock and impact resistance for the bulb, which is important when the light it utilized on agricultural field equipment which, in use, may travel over rough terrain.

The bulb holder 23 provides a multiple function in not only supporting the bulb, but the outer edge of the bulb holder prevents inward deformation of the resilient grommet. As the bulb holder 23 is preferably formed of metal, it serves to dissipate heat from the bulb outwardly to the grommet 16 and this is particularly important when utilizing a high intensity flashing bulb.

The resilient grommet 16 also functions as an adaptor having a generally rectangular outer surface which conforms to the aperture 15 in the housing 3, and having a circular central opening 17 to receive the lenses.

It is believed that the 45° orientation of the bulbs relative to the base of the housing aids in dampening vibrations to the bulb and further enables the electrical leads from both bulbs to be conveniently gathered together and fed to the outside of the housing.

Various modes of carrying out the invention are contemplated as being within the scope of the following claims particularly pointing out and distinctly claiming the subject matter which is regarded as the invention.

We claim:

1. A light assembly, comprising an outer housing having an aperture, an annular resilient grommet disposed in said aperture and having a central opening, a bulb holder mounted in the central opening, a light bulb removably mounted in said bulb holder, said bulb holder being generally circular in planar configuration and including a curved outer edge, attaching means for attaching the curved outer edge to an inner surface of said grommet, said attaching means comprising a plurality of notches for receiving said outer edge, each notch being defined by a pair of opposed tabs which are formed from the inner surface of said grommet, electrical connecting means connected to the bulb and extending outwardly in sealed relation through said grommet, and a lens covering the opening in said grommet.

2. The light assembly of claim 1, wherein said lens has a peripheral edge, and said assembly includes sealing means for sealing said peripheral edge to said grommet.

3. The light assembly of claim 2, wherein said sealing means comprises a groove formed in an inner surface of said grommet to receive the peripheral edge of said lens.

4. The light assembly of claim 1, wherein each tab has an inclined surface which projects from said grommet and terminates in a shoulder, said shoulders of opposed tabs being disposed in spaced opposed relation and defining said notch.

5. The light assembly of claim 1, and including locating means interconnecting said housing and said grommet for locating said grommet within said aperture.

6. The light assembly of claim 5, wherein said locating means comprises a projection on an outer surface of said grommet and disposed to engage an abutment on the housing.

7. The light assembly of claim 6, wherein said projection comprises a first rib extending longitudinally of an axis of the opening and said abutment comprises a second annular rib disposed outwardly of said aperture.

8. The light assembly of claim 1, wherein said housing has a flat base surface, said bulb holder including a generally cylindrical socket disposed to receive a base portion of said light bulb, a longitudinal axis of said socket being disposed at an acute angle relative to said base surface.

9. The light assembly of claim 8, wherein said acute angle is about 45°.

10. The light assembly of claim 1, wherein said aperture extends through said housing and said opening extends through said grommet, said lens enclosing a first end of said opening, said light assembly also including a closure enclosing a second end of said opening.

11. The light assembly of claim 10, wherein said closure comprises a second lens.

12. The light assembly of claim 10, wherein said closure comprises an opaque plate.

13. A light assembly comprising an outer housing having an aperture therein, an annular resilient grommet disposed within the aperture and having a central opening extending therethrough, said opening having a first end and a second end, a bulb holder disposed within said opening between said first and second ends and including a socket, a light bulb having a base portion disposed in said socket, electrical connecting means extending in sealed relation through said grommet and connected to said light bulb, a lens enclosing a first end of said opening, and a closure enclosing the second end of said opening, said electrical connecting means including a tab extending from said bulb holder and disposed through a slit in said grommet.

14. The light assembly of claim 13, and including first sealing means for sealing the peripheral edge of the lens to the grommet, and second sealing means for sealing the peripheral edge of said closure to said grommet.

15. The light assembly of claim 14, wherein said housing has a flat base, a longitudinal axis of said bulb being disposed at an acute angle to said base.

16. The light assembly of claim 13, and further including a conductor engaged with a contact on the base portion of the bulb and extending through a second slit in said grommet.

17. The light assembly of claim 13, wherein said housing has a flat base, and said assembly includes mounting means for mounting said base to an outside object.

18. The light assembly of claim 17, wherein said housing has a surface disposed parallel to said base, said mounting means including a plurality of holes extending between said base and said surface and disposed to receive a fastener.

19. The light assembly of claim 17, wherein said mounting means comprises a nut, nut retaining means disposed internally of said housing to receive and hold said nut, said mounting means also including a hole in said base and communicating with said nut retaining means, said hole adapted to receive a bolt to be threaded to said nut.

20. A light assembly, comprising an outer housing having an aperture, an annular resilient grommet disposed in said aperture and having a central opening, bulb holding means mounted in the central opening and supported solely by said grommet, said bulb holding means including a cylindrical socket spaced radially inward of said grommet, said bulb holding and comprising a plate having a curved outer edge, attaching means formed from an inner surface of said grommet for attaching the curved outer edge to an inner surface of said grommet, a light bulb removably connected in said socket, electrical connecting means connected to the light bulb and extending outwardly in sealed relation through said grommet, and a lens covering the opening in said grommet.

21. A light assembly, comprising an outer housing having an aperture, an annular resilient grommet disposed in said aperture and having a central opening, bulb holding means mounted in the central opening and including a generally cylindrical socket, a light bulb removably mounted in said socket, said socket having an axis lying in a vertical transverse plane that extends normal to an axis of the opening in said grommet, said housing having a generally flat horizontal base and said axis of the socket is disposed at an acute angle to said base, electrical connecting means connected to the light bulb and extending outwardly in sealed relation through the grommet, and a lens covering the opening in the grommet.

* * * * *

UNITED STATES PATENT AND TRADEMARK OFFICE
CERTIFICATE OF CORRECTION

PATENT NO. : 5,335,155
DATED : August 2, 1994
INVENTOR(S) : Brian A. Hanson et al It is certified that error appears in the above-indentified patent and that said Letters Patent is hereby corrected as shown below:

Col. 6, Line 58, CLAIM 20, After "holding" insert --means--;
Col. 6, Line 58, CLAIM 20, Delete "and"; Col. 6, Line 61,
CLAIM 20, Delete "an" and substitute therefor --said--

Signed and Sealed this

Twenty-second Day of November, 1994

Attest:

BRUCE LEHMAN

*Attesting Officer*     *Commissioner of Patents and Trademarks*